United States Patent
Bayha et al.

(10) Patent No.: US 9,297,901 B2
(45) Date of Patent: Mar. 29, 2016

(54) OPTICAL MEASURING DEVICE AND A METHOD FOR PRODUCING A COVER DISC FOR A HOUSING OF AN OPTICAL MEASURING DEVICE

(71) Applicant: VALEO Schalter und Sensoren GmbH, Bietigheim-Bissingen (DE)

(72) Inventors: Heiner Bayha, Satow OT Clausdorf (DE); Peter Horvath, Vaihingen a. d. Enz (DE); Jens Nicolai, Neupetershain (DE); Andreas Reichert, Sachsenheim (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/366,017

(22) PCT Filed: Nov. 30, 2012

(86) PCT No.: PCT/EP2012/074090
§ 371 (c)(1),
(2) Date: Jun. 17, 2014

(87) PCT Pub. No.: WO2013/092168
PCT Pub. Date: Jun. 27, 2013

(65) Prior Publication Data
US 2014/0320845 A1   Oct. 30, 2014

(30) Foreign Application Priority Data
Dec. 23, 2011   (DE) .................. 10 2011 122 345

(51) Int. Cl.
*G01S 17/02*   (2006.01)
*G01S 17/93*   (2006.01)
(Continued)

(52) U.S. Cl.
CPC .............. *G01S 17/026* (2013.01); *B29C 70/72* (2013.01); *G01S 7/4813* (2013.01); *G01S 17/936* (2013.01); *G01S 2007/4977* (2013.01)

(58) Field of Classification Search
CPC . G01S 17/00–17/10; G01S 7/48; G01S 17/50
USPC .............. 356/3.01–3.15, 4.01, 4.1, 5.01–5.15
See application file for complete search history.

(56) References Cited

U.S. PATENT DOCUMENTS 5,321,490 A * 6/1994 Olson et al. .................. 356/5.03
5,463,384 A   10/1995 Juds
(Continued)

FOREIGN PATENT DOCUMENTS

DE   25 36 910 A1   2/1977
DE   196 44 164 A1   4/1998
(Continued)

OTHER PUBLICATIONS

International Search Report for corresponding International Application No. PCT/EP2012/074090, mailed Mar. 20, 2013 (2 pages).
Office Action for corresponding German Application No. 10 2011 122 345.6, mailed Jun. 4, 2012 (8 pages).

*Primary Examiner* — Luke Ratcliffe
(74) *Attorney, Agent, or Firm* — Osha Liang LLP

(57) ABSTRACT

The invention relates to an optical measuring device (1) having a housing (3), in which at least one optical emitter (20) for emitting at least one emission beam (22, 24) and at least one optical receiver are arranged, wherein a cover disc (5) terminates the housing and forms an emission window (10) and a reception window (7), wherein the at least one emission beam (22, 24) exits from the housing through the emission window (10), wherein the receiver receives the emission beam, which is reflected from the surroundings, as a reception beam through the reception window (7), and wherein the cover disc (5) has a heating assembly (20), and a corresponding method for producing a cover disc (5) for the optical measuring device (1).
To provide an optical measuring device (1) having a heating assembly (20), which does not distort an emission beam as it exits from the housing (3) of the measuring device (1) via the cover disc (5), the heating assembly (20) is arranged essentially in the region of the reception window (7) and the region of the emission window (10) is left out.

10 Claims, 2 Drawing Sheets

(51) Int. Cl.
  *G01S 7/481* (2006.01)
  *B29C 70/72* (2006.01)
  *G01S 7/497* (2006.01)

(56) References Cited

U.S. PATENT DOCUMENTS

2003/0218737 A1* 11/2003 Gogolla et al. ............. 356/3.03
2005/0115943 A1* 6/2005 Winter et al. ............. 219/202

FOREIGN PATENT DOCUMENTS

| DE | 197 33 000 A1 | 8/1998 |
| DE | 199 56 089 A1 | 6/2001 |
| EP | 1 902 902 A1 | 3/2008 |
| EP | 2 026 095 A1 | 2/2009 |
| WO | 2008/018955 A2 | 2/2008 |

* cited by examiner

OPTICAL MEASURING DEVICE AND A METHOD FOR PRODUCING A COVER DISC FOR A HOUSING OF AN OPTICAL MEASURING DEVICE

The invention relates to an optical measuring device of the type mentioned in the preamble of claim 1, and also a method for producing a cover disc of the type mentioned in claim 9.

Scanning optical measuring devices, so-called laser scanners or lidar (light detection and ranging) are known from the prior art for vehicles for recognizing objects and/or obstructions in a monitoring region. These optical measuring devices determine the distance to objects and/or obstructions recognized in the monitoring region using the light pulse runtime method.

The optical measuring devices comprise a housing, in which at least one optical emitter for emitting at least one emission beam and at least one optical receiver for receiving a reception beam are arranged. The receiver receives the beams reflected on objects and/or obstructions and ascertains the distance to the objects and/or obstructions from the light pulse runtime. The housing is terminated by a cover disc, which forms an emission window and a reception window, wherein the at least one emission beam exits from the housing through the emission window, and wherein the receiver receives the emission beam reflected from the surroundings as the reception beam through the reception window.

These optical measuring devices are typically installed behind a radiator grille of a vehicle and are subjected to weather influences such as snow, ice, and/or water. To remove deposits from weather influences, the cover disc is indirectly heated via at least one electrical heating conductor, which is applied to a film. An adhesive layer is applied to the film, which is to ensure the contact of the at least one electrical heating conductor with the cover disc. In this case, the transmitted heating power is dependent on the mechanical contacting quality of the adhesive layer.

For example, a radar system having a dielectric body in a beam path for electromagnetic waves is disclosed in Published Application DE 196 44 164 A1, wherein the dielectric body is equipped with an assembly of electrically conductive heating conductors, whereby the dielectric body can be heated. The di-electric body can be embodied as a lens, for example, which focuses or scatters the penetrating electromagnetic waves. The electrically conductive heating conductors are substantially perpendicular to the polarization direction of the emitted and/or received electromagnetic waves. Inter alia, weather-related and/or surroundings-related contaminants can be removed from and/or detected on the surface of the dielectric body by the heating using the electrically conductive heating conductors.

A radar system, the cover disc of which comprises a metallized film, which is embedded between two protective layers, is described in Patent Specification EP 1 902 902 A1. This film is used to heat the cover disc in order to keep it free of weather influences. Furthermore, a production method of such a cover disc is described. In the described method, the metallized film is extrusion coated using a first plastic to form a composite and a rear side of the film is back-injected using a second plastic to form a composite.

The object of the invention is to refine an optical measuring device of the type mentioned in the preamble of claim 1 and a production method of a cover disc of the type mentioned in the preamble of Claim 9 in such a manner that an emitted emission beam is not distorted by a heating assembly as it exits from the housing of the measuring device via the cover disc. A cover disc, which is heatable without distorting an emitted emission beam, can be prepared via the production method.

This object is achieved according to the invention by an optical measuring device having the features of Claim 1 and by a production method of a cover disc of the type mentioned in the preamble of Claim 9. The dependent claims contain further features which advantageously implement the embodiments of the invention.

The advantage achieved by the invention is that an emission beam is not distorted by a heating assembly during emission and in particular is well-defined in cross section. The cross section of the emission beam has, for example, a width in the range of approximately 10 μm and a height in the range of approximately 235 μm.

The fundamental idea of the invention is based on the fact that a heating assembly is arranged essentially in the region of a reception window and a region of an emission window is left out, whereby no reflection and/or corruption of the emission beam occurs in the region of the emission window. The analysis of the received reception beam can thus advantageously be made easier, to make correct inferences about existing objects and obstructions.

An optical measuring device according to the invention comprises a housing, in which at least one optical emitter for emitting at least one emission beam and at least one optical receiver for receiving a reception beam are arranged, wherein a cover disc terminates the housing and forms an emission window and a reception window, wherein the at least one emission beam exits from the housing through the emission window, wherein the receiver receives the emission beam, which is reflected from the surroundings, as a reception beam through the reception window, and wherein the cover disc has a heating assembly. According to the invention, the heating assembly is arranged essentially in the region of the reception window and the region of the emission window is left out by the heating assembly.

In addition, a production method for a cover disc of a housing of an optical measuring device is proposed, which comprises an emission window, a reception window, and a heating assembly having at least one electrical heating conductor. According to the invention, the heating assembly is laid in a tool mould so that the at least one electrical heating conductor of the heating assembly is arranged after an injection-moulding operation in the region of the reception window and the region of the emission window is left out by the at least one electrical heating conductor of the heating assembly.

A tool mould is understood hereafter as the shaping injection-moulding tool, using which the cover disc is prepared. In this case, the injection-moulding tool is filled with at least one plastic material, which is cured after the injection-moulding operation.

In an advantageous embodiment of the optical measuring device according to the invention, the heating assembly can have at least one electrical heating conductor, which is applied to an elastic carrier. The elastic carrier having the at least one electrical heating conductor can advantageously be connected, during the production of the reception window, to the reception window in a tool mould during an injection-moulding operation. The installation of the heating assembly on the reception window is thus dispensed with, whereby a reduction of the processing steps and a simplification of the handling can advantageously be achieved. Furthermore, such elastic carriers can be embodied as extraordinarily thin, so that they can be adapted easily to arbitrary shapes of the cover disc. The elastic carrier is preferably embodied as a film, on which the at least one electrical heating conductor is applied as a metallization. This advantageously allows a variety of methods for applying the at least one electrical heating conductor to the film, for example, vapour deposition or a screen-printing method. Furthermore, such films are advantageously stable and nonetheless elastic and deformable and can therefore be adapted to nearly any shape of the cover disc.

In a further advantageous embodiment of the optical measuring device according to the invention, the heating assembly can be arranged on an external surface and/or on an internal surface of the reception window and/or can be integrated in the reception window. In the event of an attachment to the external surface of the reception window, less power is advantageously necessary to achieve the desired heating effect. The at least one electrical heating conductor is advantageously protected in this case from external influences by the elastic carrier and by the reception window. In the event of an attachment to the internal surface of the reception window, the heating assembly is advantageously protected from external influences by the housing of the optical measuring device. In the event of an integration of the heating assembly in the reception window, a good thermal attachment and also good protection by the reception window can advantageously be achieved.

In a further advantageous embodiment of the optical measuring device according to the invention, the at least one electrical heating conductor can extend directly on the reception window and can touch the reception window on at least one touch region. In this manner, heating energy can advantageously be saved, since the heating power is transferred directly to the reception window without being attenuated by intermediate layers.

In a further advantageous embodiment of the optical measuring device according to the invention, the at least one electrical heating conductor can extend in the reception window essentially horizontally, in particular in parallel to the vehicle transverse axis. In this manner, a uniform level loss within a scanning operation is advantageously achieved. If the at least one electrical heating path extended vertically, in particular in parallel, to the vehicle vertical axis, an uneven level loss and therefore measuring errors would occur.

In a further advantageous embodiment of the optical measuring device according to the invention, the at least one electrical heating conductor can extend vertically, in particular in parallel to the vehicle vertical axis, on an edge region of the reception window and can be electrically contacted via at least one contact region. In the event of a parallel arrangement of multiple electrical heating conductors, an easily implementable electrical contact of these electrical heating conductors can advantageously be performed by the vertically extending heating conductor. Furthermore, an electrical contact can advantageously be implemented in a space-saving manner by a plug on the edge of the reception window.

In a further advantageous embodiment of the optical measuring device according to the invention, the at least one electrical heating conductor can be arranged in a meandering form on the carrier. In this manner, a large surface area can advantageously be covered in a space-saving manner by the at least one electrical heating conductor.

In a further advantageous embodiment of the method according to the invention for producing a cover disc for a housing of an optical measuring device, during the injection-moulding operation, the heating assembly can be connected to an external surface and/or an internal surface of the reception window and/or integrated in the reception window. This can advantageously be implemented by back-injection and/or overmoulding and/or extrusion coating of the heating assembly. Furthermore, a heating assembly is implementable which only comprises the electrical heating conductors, which can be embodied as heating wires, for example. These heating wires can be incorporated directly into the reception window, wherein the heating wires are embedded in a pre-injection method using the disc material and pressed into the desired shape and/or position.

Subsequently, the heating assembly, which is embodied as a premoulded part, is laid in the injection-moulding tool and the cover disc for the housing of the optical measuring device is finished in a final injection-moulding operation.

An exemplary embodiment of the invention will be explained in greater detail hereafter on the basis of an illustration in the drawing.

Figure 1:
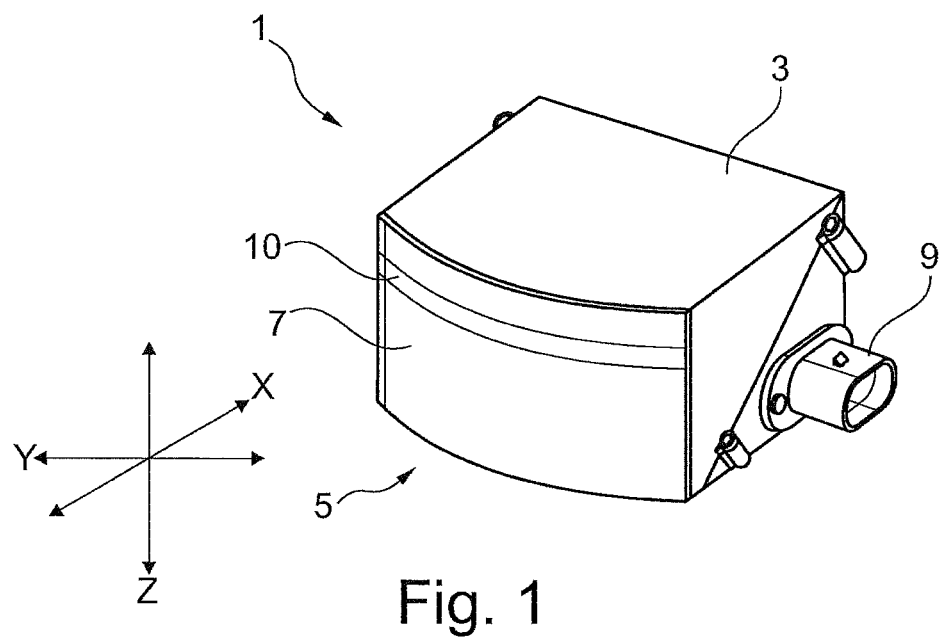
FIG. 1 shows a schematic perspective illustration of an optical measuring device according to the invention.

As is apparent from FIG. 1, an optical measuring device 1 comprises a housing 3 and a cover disc 5, which terminates the housing and forms an emission window 10 and a reception window 7. An emission beam (not shown), for example, a pulsed laser light, is emitted through the emission window 10. Laser light (not shown in the figure), which is reflected by objects in a monitoring region, is received as a reception beam through the reception window 7. The distance to recognized objects or obstructions in a monitoring region is calculated via the measured runtime between the emission of the emission beam and the reception of the reception beam according to a light pulse runtime method.

The housing 3 additionally has an electrical terminal 9, via which the measuring device 1 is connected to other modules.

Figure 2:
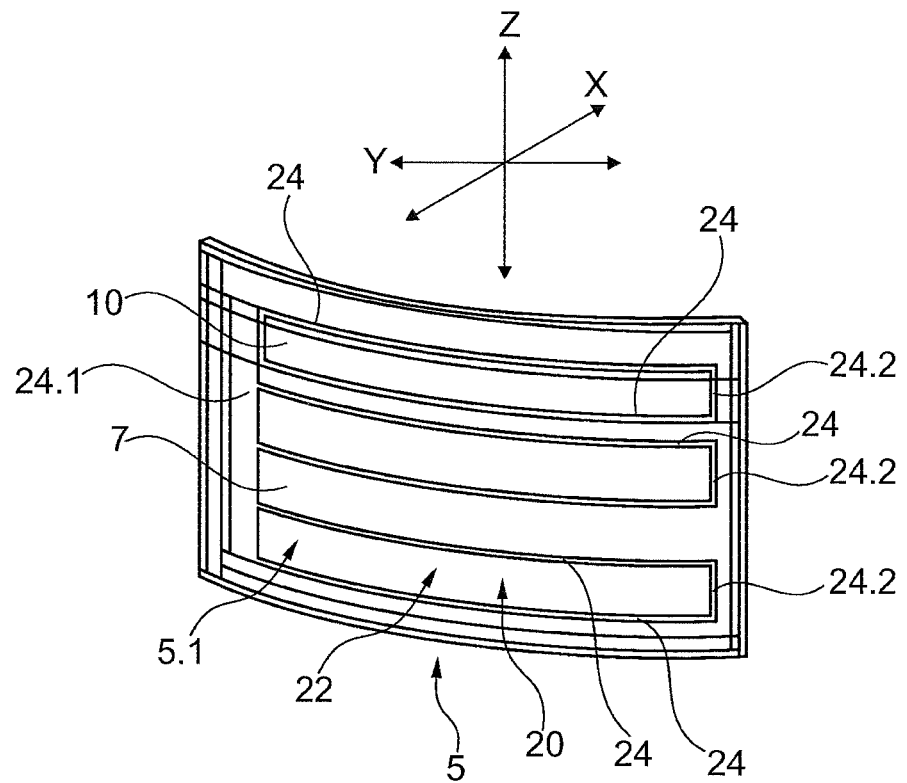
FIG. 2 shows a schematic, perspective front view of a cover disc of the optical measuring device from FIG. 1.
Figure 3:
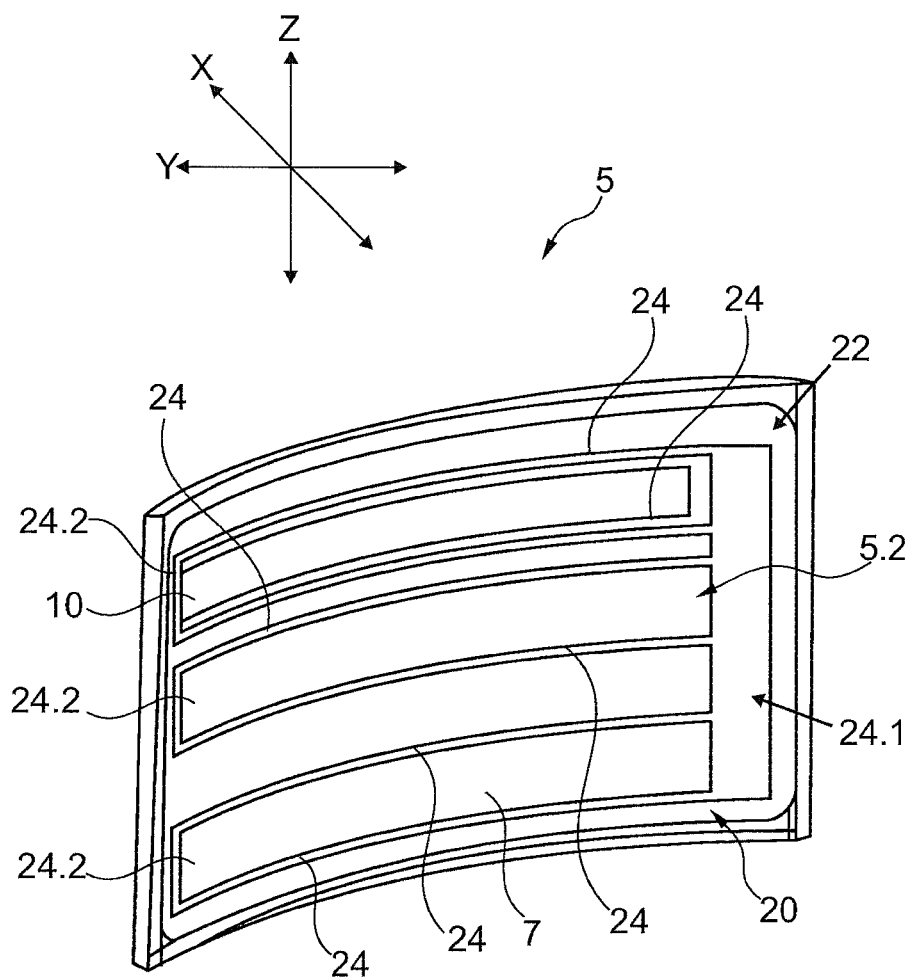
FIG. 3 shows a perspective rear view of a cover disc of the optical measuring device from FIG. 1.

As is furthermore apparent from FIGS. 2 and 3, the cover disc 5 has a heating assembly 20. Weather-related and/or surroundings-related contaminants, for example, snow and/or ice and/or water, are removed from the surface of the cover disc 5 via this heating assembly 20.

According to the invention, the heating assembly 20 is arranged essentially in the region of the reception window 7. The region of the emission window 10 is left out. Because the heating assembly 20 is not arranged in the region of the emission window 10, no distortions and/or reflections of the emission beam occur. Therefore, in particular the cross section of the emission beam can be precisely defined.

As is furthermore apparent from FIGS. 2 and 3, the heating assembly 20 has at least one electrical heating conductor 24, 24.1, 24.2, which is applied to an elastic carrier 22. The elastic carrier 22 is embodied in the illustrated exemplary embodiment as a film, on which the at least one electrical heating conductor 24, 24.1, 24.2 is applied as a metallization.

Alternatively, the at least one heating conductor 24, 24.1, 24.2 can also be embodied as a heating wire, which can also be applied to an elastic carrier 22 or integrated directly into the reception window 7.

As is furthermore apparent from FIGS. 2 and 3, the heating assembly 20 is arranged essentially on an internal surface 5.2 of the reception window 7. An arrangement of the heating assembly 20 on an external surface 5.1 of the reception window 7 would also be conceivable. One heating assembly 20 can also be arranged in each case on the internal surface 5.1 and on the external surface 5.2 of the reception window 7. It is to be ensured in this case that the metallized layer is applied directly to the reception window 7, so to be protected both by the reception window 7 and also by the carrier film 22.

In a further exemplary embodiment (not shown), the heating assembly 20 can be integrated as a further alternative in the reception window 7.

As is furthermore apparent from FIGS. 2 and 3, the electrical heating assembly 20 covers nearly the entire rear surface of the cover disc 5, wherein only the region of the emission window 10 is left out. Since the emission window 10 is embodied as very narrow in comparison to the reception window 7, a horizontally extending heating conductor 24 is arranged in each case on the upper and lower edge of the emission window 10 and a vertically extending heating conductor 24.1, 24.2 is arranged in each case on the left and right edge of the emission window 10, so that the emission window 10 is framed by heating conductors 24, 24.1, 24.2 of the heating assembly 20 and is heated "indirectly".

As is furthermore apparent from FIGS. 2 and 3, multiple electrical heating conductors 24, 24.1, 24.2 extend directly in the region of the reception window 7 and touch the reception window 7 on at least one touch region. In this manner, less power is required to achieve the desired heating effect.

Furthermore, the electrical heating conductors 24 in the reception window 7 extend essentially horizontally, in particular in parallel to the vehicle transverse axis y. It is presumed in this case that the optical measuring device 1 is attached to the radiator grille of a vehicle, wherein the reception window extends in parallel to the radiator grille. In this manner, a uniform level loss is generated within a scanning operation.

As is furthermore apparent from FIGS. 2 and 3, an electrical heating conductor 24.1 extends on an edge region of the reception window 7 vertically, in particular in parallel to the vehicle vertical axis z, and can be electrically contacted via at least one contact region. The edge region of the reception window 7 can be understood in this case as a reception window frame or a passage region for electromagnetic beams which is less relevant for the analysis.

As is furthermore apparent from FIGS. 2 and 3, all horizontally extending heating conductors 24 are connected to the vertically extending heating conductor 24.1, which is embodied as wider and can therefore be used for contacting. In the illustrated exemplary embodiment, in each case two horizontally extending heating conductors 24 are connected via one further vertically extending heating conductor 24.2. In the illustrated exemplary embodiment, the distances of the horizontally extending heating conductors 24 are nearly identical.

In a further embodiment (not shown), the at least one electrical heating conductor 24, 24.1, 24.2 can be arranged in a meandering form on the carrier 22 and/or in the reception window 7.

Furthermore, other suitable assemblies of the heating conductors 24, 24.1, 24.2 are also conceivable.

In a method for producing a cover disc 5 for a housing 3 of an optical measuring device 1, wherein the cover disc 5 comprises an emission window 10, a reception window 7, and a heating assembly 20 having at least one electrical heating conductor 24, 24.1, 24.2, to produce the heating assembly 20, in one method step, the at least one electrical heating conductor 24, 24.1, 24.2 is applied to an elastic carrier 22. In a further method step, the heating assembly 20 is laid in a tool mould so that the heating assembly 20 is arranged in the region of the reception window 7 after an injection-moulding operation and the region of the emission window 3 is left out by the heating assembly 20. This means that the at least one electrical heating conductor 24, 24.1, 24.2 is arranged essentially in the region of the reception window 7 and no electrical heating conductor 24, 24.1, 24.2 is arranged in the region of the emission window 10.

In this case, the at least one electrical heating conductor 24, 24.1, 24.2 can also be arranged outside the reception window 7 in regions of the cover disc 5, for example, on the edge of the emission window 10, to allow indirect heating of the emission window 10.

During the injection-moulding operation, the heating assembly 20 is connected to an external surface 5.1 and/or an internal surface 5.2 of the reception window and/or integrated in the reception window 7. For this purpose, the heating assembly 20 can either be back-injected or overmoulded or extrusion coated. It is to be ensured in this case that the metallized layer or the at least one electrical heating conductor 24, 24.1, 24.2 presses directly against the cover disc 5 or the reception window 7, so as to still be protected by the carrier film.

In an alternative method for producing a cover disc 5 for a housing 3 of an optical measuring device 1, to produce the heating assembly 20, in one method step, at least one electrical heating conductor 24, 24.1, 24.2 is embodied as a heating wire and is laid in premoulded parts in the tool mould. The premoulded part prevents the at least one heating wire 24, 24.1, 24.2 from being moved out of its position or destroyed because of the prevailing pressures. Furthermore, the premoulded part is arranged in the tool mould so that the at least one heating wire 24, 24.1, 24.2 is arranged in the region of the reception window 7 after the injection-moulding operation and the region of the emission window 3 is left out.

Embodiments of the optical measuring device according to the invention and the cover disc produced by the method according to the invention for a housing of an optical measuring device are suitable in particular for attachment to a radiator grille of a motor vehicle. Weather-related contaminants, for example, ice and/or snow, can be removed from the reception window by the heating device. The region of the emission window remains left out in this case, so that no distortion of the emission beam by the heating device can occur.

LIST OF REFERENCE SIGNS

1 Laser scanner
3 Housing
5 Cover disc
5.1 External side
5.2 Internal side
7 Reception window
9 Electrical connection
10 Emission window
20 Heating assembly
22 Carrier
24 Parallel heating path
24.1, 24.2 Perpendicular heating path
Y Vehicle transverse axis
Z Vehicle vertical axis

The invention claimed is:

1. An optical measuring device, comprising:
a housing, in which at least one optical emitter for emitting at least one emission beam and at least one optical receiver for receiving a reception beam are arranged,
wherein a cover disc terminates the housing and forms an emission window and a reception window, wherein the at least one emission beam exits from the housing through the emission window,
wherein the optical receiver receives the emission beam, which is reflected from the surroundings, as a reception beam through the reception window, and wherein the cover disc has a heating assembly arranged essentially in the region of the reception window with the region of the emission window being left out.

2. The device according to claim 1, wherein the heating assembly has at least one electrical heating conductor, which is applied to an elastic carrier.

3. The device according to claim 2, wherein the elastic carrier is embodied as a film, on which the at least one electrical heating conductor is applied as a metallization.

4. The device according to claim 1, wherein the heating assembly is one of arranged on an external surface, arranged on an internal surface of the reception window, and is integrated in the reception window.

5. The device according to claim 4, wherein the at least one electrical heating conductor extends directly on the reception window and touches the reception window on at least one touch region.

6. The device according to claim 4, wherein the at least one electrical heating conductor extends in the reception window essentially horizontally in parallel to a vehicle transverse axis.

7. The device according to claim 4, wherein the at least one electrical heating conductor extends vertically, in parallel to a vehicle vertical axis, on an edge region of the reception window and can be electrically contacted via at least one contact region.

8. The device according to claim 4, wherein the at least one electrical heating conductor is arranged in a meandering form on the carrier.

9. A method for producing a cover disc for a housing of an optical measuring device, wherein the cover disc comprises an emission window, a reception window, and a heating assembly having at least one electrical heating conductor, the method comprising:
   laying the heating assembly in a tool mould so that the at least one electrical heating conductor of the heating assembly is arranged after an injection-moulding operation in the region of the reception window and the region of the emission window is left out by the at least one electrical heating conductor of the heating assembly.

10. The method according to claim 9, wherein, during the injection-moulding operation, the heating assembly is connected to an external surface and/or an internal surface of the reception window and/or integrated in the reception window.

* * * * *